Dec. 13, 1966  S. B. RONDUM  3,290,724
MOLD EJECTOR
Filed May 20, 1964  2 Sheets-Sheet 1
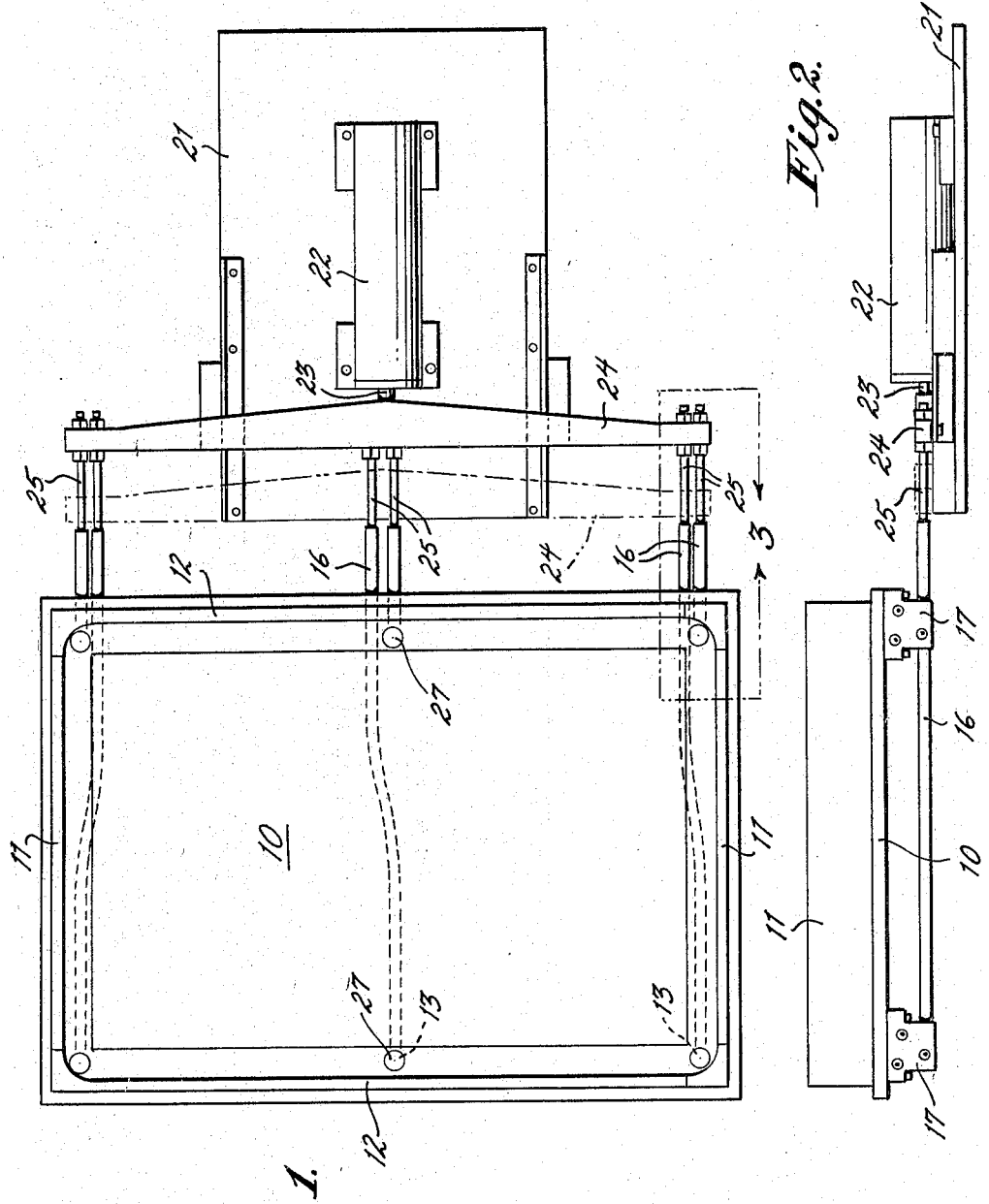
INVENTOR.
SVEND B. RONDUM
BY
ATTORNEY

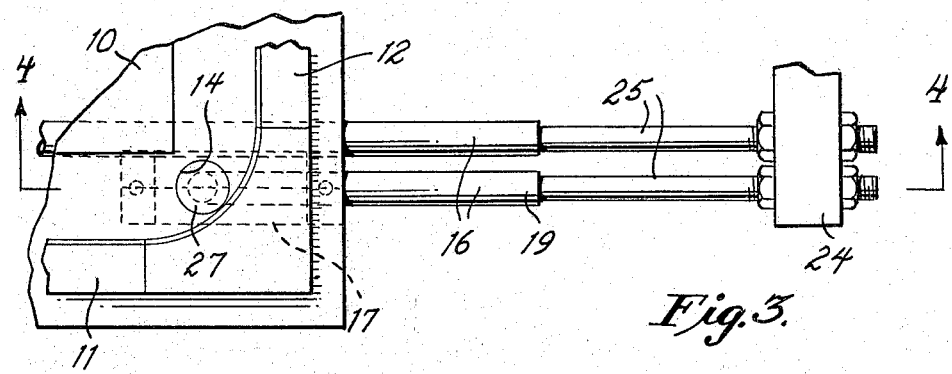
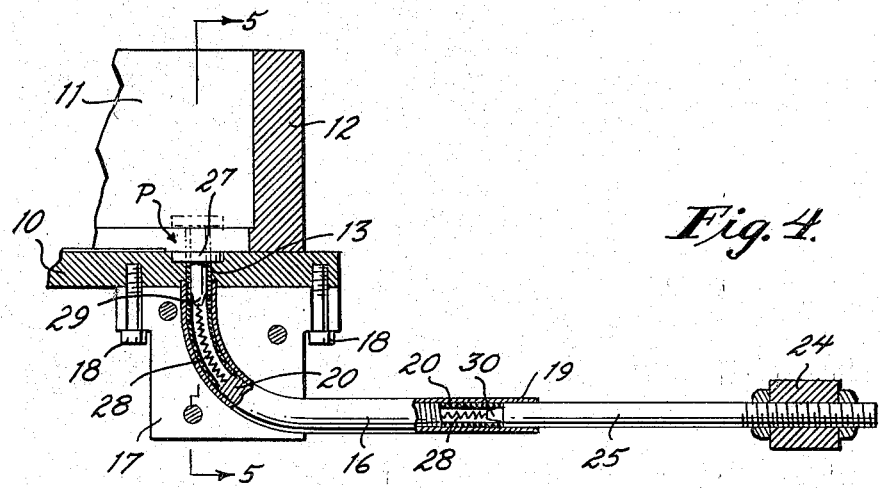
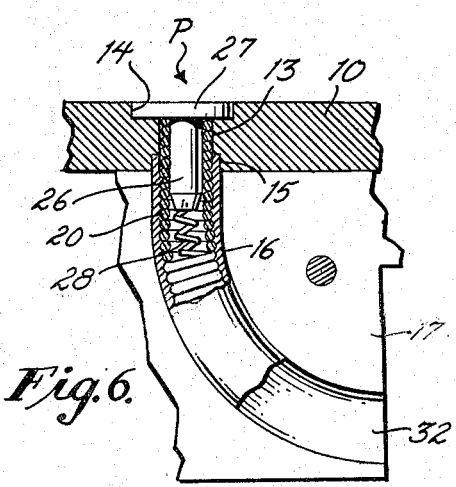
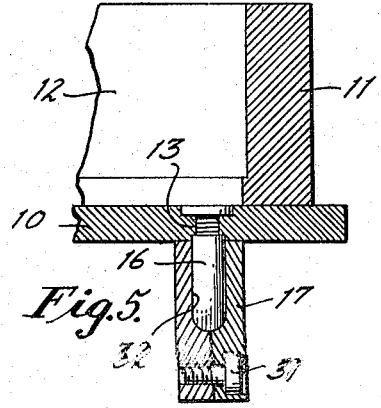
INVENTOR.
SVEND B. RONDUM

United States Patent Office 3,290,724
Patented Dec. 13, 1966

3,290,724
MOLD EJECTOR
Svend B. Rondum, Bradford, Pa., assignor to Plexowood, Inc., a corporation of Pennsylvania
Filed May 20, 1964, Ser. No. 368,784
11 Claims. (Cl. 18—2)

The present invention relates to a mold ejector and is concerned primarily with an ejecting mechanism that is particularly adapted to breaking the bond between a formed article and the female mold part in which it is formed.

At the present time certain articles are formed from a composite mixture such as wood chips and resin. An example of this is the co-pending application of Svend B. Rondum, Serial #252,132, filed January 17, 1963 for "Laminated Countertop." When a composite body is molded under heat and pressure it is inevitable that the formed article exhibit an affinity to the female mold part. Thus, there is a bond which must be initially broken in order to eject the formed article from the mold.

With this condition in mind, an important object of the present invention is to provide mold ejecting mechanism which is particularly adapted to the breaking of this bond and which is also capable of raising the formed article out of the female mold part.

Certain types of formed articles such as countertops, chair seats, and the like have a substantial extent on a horizontal plane. If such an article is to be ejected, it must be engaged by the ejecting mechanism at a plurality of spaced points. Thus, another object of the invention is to provide mold ejector mechanisms which include a plurality of ejector pins that are appropriately spaced in the female mold part so as to engage the underside of the formed article and raise it from the mold.

It is evident that each ejector pin must be mechanically connected to a prime mover so that the thrust generated by the latter will be transmitted to the pins and thus, cause the desired ejecting action.

With this thought in mind, a further object of the invention is to provide a mold ejector of the character aforesaid which includes one or more ejector pins, a prime mover, and mechanical connections between the prime mover and the ejector pins.

The path over which the force from the prime mover is transmitted to each ejector pin is not in a straight line. Hence, the mechanical connections aforesaid must be capable of accommodating such a path of transition. With this thought in mind, a further object of the invention is to provide mold ejecting mechanisms of the type aforesaid which includes a curved tube, one end of which is anchored into the mold bottom at an ejector pin with the tube housing a helical coiled spring. One end of this coiled spring is anchored to the ejector pin and the other end is secured to mechanical linkage which is in turn connected to the prime mover. Thus, the spring is particularly adapted to transmit a thrust from the linkage aforesaid to the ejector pin.

The coil spring aforesaid is for all effective purposes, a flexible thrust rod which is housed in the tube aforesaid to render it effective when a thrust is applied thereto. It also constitutes a resilent means for retracting the ejector pins after an ejecting operation.

Another object of the invention is to provide in a mold ejector of the type indicated, an ejector pin having a flat head and a threaded shank. The shank is adapted to be connected to one end of a flexible thrust rod in the form of a coil spring by being threaded into the helices thereof. The flat head is countersunk in an appropriate recess formed in the mold bottom where each ejector pin is located.

In retracting the ejector pins, it is of the utmost importance that all of the heads thereof be received in the countersinks provided therefor so that the top faces of the heads will lie flush with the mold bottom. This is necessary in order to insure that the contour of the formed article will not be impaired. Tension may be applied by the prime mover through mechanical linkage to the coil springs to achieve this retracted condition. However, in order to definitely insure that all the ejector pin heads will lie flush with the molded bottom in a retracted condition a further object is to provide auxiliary tension springs which are housed within the flexible thrust rods aforesaid with each such auxiliary spring being anchored to the shank of an ejector pin.

Various other more detailed objectives and advantages of the invention such as arise in connection with carrying out the above noted ideas in a practical embodiment will in part become apparent and in part be hereinafter stated as a description of the invention proceeds.

The invention therefore comprises a mold ejector including a plurality of ejector pins each having a head and a shank which are received at appropriate points in the bottom of a female mold part. Associated with each ejector pin is a curved tube housing a flexible thrust rod in the form of a helical spring with one end of each spring being anchored to the shank of a pin and the other end to mechanical linkage which is in turn operatively connected to a prime mover together with auxiliary tension springs with said flexible thrust rods being connected to the shank of each pin.

For a full and more complete understanding of the invention reference may be had to the following description and accompanying drawings wherein:

FIGURE 1 is a top plan view of the female mold part with which is assembled the mold ejector of this invention.

FIGURE 2 is a view in side elevation of the mold part and ejector mechanism depicted in FIGURE 1.

FIGURE 3 is a detail taken on an enlarged scale on one corner of the mold part and the ejecting mechanism immediately associated therewith.

FIGURE 4 is a detailed section taken about on the plane represented by the line 4—4 of FIGURE 3.

FIGURE 5 is another detailed section taken about on the plane represented by the line 5—5 of FIGURE 4 and, FIGURE 6 is another detailed section taken on an enlarged scale partly in section and partly in elevation depicting how one ejector pin is mounted in the mold bottom and operatively connected to the flexible thrust rod.

Referring now to the drawing, and first more particularly to FIGURE 1, a female mold is therein illustrated and shown as including a bottom wall 10, end walls 11, and side walls 12. The end walls 11, side walls 12, and bottom 10 define the configuration of the article to be formed by the mold. Obviously, this contour will vary with different articles which are formed. In any case, the bottom 10 is formed with a plurality of openings 13 (see FIGURE 6) which are enlarged or countersunk at the top to provide recesses 14. They are also enlarged on the undersurface to provide recesses 15 for a purpose to be later described.

As shown in FIGURE 1 there are six of these openings 13, one being located at each corner and one at the middle of each side. This number and spacing will of course, vary with the size and shape of the articles being formed.

Associated with each opening 13 is a curved tube 16, the upper end of which is anchored to the mold bottom 10 by being received in one of the recesses 15. Each tube 16 is mounted on a bracket 17 with the latter in turn being secured to the underside of the mold bottom by screw bolts 18. The end of the tube 16 remote from the opening 13 is designated 19 and it will be noted, is substantially at right angles to the tube end that is received in the recess 15.

Housed within each tube 16 is a flexible thrust rod in the form of a closely wound helical coil spring 20.

Referring again to FIGURE 1, a pedestal or supporting base for a prime mover is shown at 21. Mounted on the base 21 is a prime mover in the form of an air cylinder 22. The latter includes a piston 23 which is adapted to be reciprocated in a well known manner by the air cylinder. Connected to the piston 23 by a cross rod 24 are a plurality of rods 25, there being a rod 25 for each opening 13.

As shown more clearly in FIGURE 4, one end of each rod 25 is anchored to one end of a spring 20. This connection may be achieved by forming threads on the end of the rod 25 and screwing these threads in the closely wound turns of the spring 20 which in effect constitute a thread.

Referring now more particularly to FIGURE 6, an ejector pin which is referred to in its entirety by the reference character P is received in each opening 13. Each ejector pin includes a shank 26 which may be formed with threads whereby it may be screwed into that end of the spring 20 and flat head 27 which is received in the countersink 14. In its retracted condition, each head 27 will lie flush with the upper surface of the mold bottom 10. To insure of this condition always obtaining, an auxiliary tension spring 28 is enclosed within each spring 20. One end of this tension spring 28 is anchored to the shank 26 of a pin P as shown at 29 and the other end is anchored to a rod 25 as shown at 30.

Upon referring to FIGURE 5, it will be noted that each bracket 17 is of a two-part construction with the two parts being formed with complemental recesses at 32 which accommodate the tube 16.

*Operation*

In a retracted condition, all of the heads 27 will lie flush with the upper surface of the mold bottom 10. This condition is definitely assured by retraction of the piston 23 under the influence of the air cylinder 22 and the tension which is applied to the shank 26 of the pin P by the springs 20 and 28.

When a formed article is to be ejected from the mold, the air cylinder 22 is operated to impart an outward thrust to the piston 23. This thrust is transmitted through the cross rod 24 and rods 25 to each of the flexible thrust rods 20. As the latter are enclosed by the tube 16, the thrust is in turn transmitted to the ejector pins P to move the latter upwardly. Sufficient force is generated to break the bond between the formed articles in the sides of the mold. By the time the ejector pins have been moved a distance corresponding to the length of the shank 26, this bond will have been broken. Thus, during the period of this initial breaking, the flexible thrust rod is confined by the openings 13 and tube 16. After the bond is broken, a lesser thrust is sufficient to raise the formed article out of the mold and the flexible thrust rods need not be confined during this period of the operation.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. In combination with a mold including a female mold having a horizontal bottom, ejecting mechanism for molded articles comprising: an opening in said bottom, an ejecting pin in said opening, a curved tube secured to said bottom at said opening and communicating therewith, a flexible thrust rod in said tube with one end secured to said pin, a prime mover, and a mechanical connection between said prime mover and the other end of said thrust rod.

2. In combination with a mold including a female mold having a horizontal bottom, ejecting mechanism for molded articles comprising: an opening in said bottom having a countersink at its upper end, an ejecting pin in said opening having a head received in said countersink, a curved tube secured to said bottom at said opening and communicating therewith, a flexible thrust rod in said tube with one end secured to said pin, a prime mover, and a mechanical connection between said prime mover and the other end of said thrust rod.

3. The combination of claim 1 in which the flexible thrust rod takes the form of a closely wound helical spring.

4. The combination of claim 2 in which the flexible thrust rod takes the form of a closely wound helical spring that is threadedly connected to the said pin.

5. In combination with a mold including a female mold having a horizontal bottom, ejecting mechanism for molded articles comprising: a plurality of openings in said bottom in spaced relation, each of said openings having a countersink at its upper end, a threaded ejector pin in each opening with the head of each pin being received in a countersink, a plurality of curved tubes secured to the underside of said bottom, there being a tube for each opening with which that tube communicates, a flexible thrust rod in each tube having one end connected to the pin in the opening for that tube, a prime mover, and mechanical connections between said prime mover and the ends of said thrust rods remote from said springs.

6. The combination of claim 5 in which the flexible thrust rods take the form of closely wound helical springs, the ends of which are threadedly connected to said pins and mechanical connections respectively.

7. In combination with a mold including a female mold having a horizontal bottom, ejecting mechanism for molded articles comprising: an opening in said bottom, an ejecting pin in said opening, a curved tube secured to said bottom at said opening and communicating therewith, a closely wound helical spring in said tube and having one end connected to said pin, a prime mover, a mechanical connection between said prime mover and the other end of said spring, and a second more closely wound spring housed by said first spring and having one end connected to said pin and the other end to said mechanical connection.

8. In combination with a mold including a female mold having a horizontal bottom, ejecting mechanism for molded articles comprising: a plurality of openings in said bottom in spaced relation, each of said openings having a countersink at its upper end, a threaded ejector pin in each opening with the head of each pin being received in a countersink, a plurality of curved tubes secured to the underside of said bottom, there being a tube for each opening with which that tube communicates, a closely wound helical spring in each tube having one end connected to the pin in the opening for that tube, a prime mover, mechanical connections between said prime mover and the other ends of said springs, and a more closely wound spring housed within each of said first springs and having one end connected to one of said pins and the other to said mechanical connections.

9. The combination of claim 8 in which each closely wound helical spring is threadedly connected to its respective ejector pin at one end with the other end being threadedly connected to a rod that is included as a part of said mechanical connections.

10. In combination with a mold including a female mold designed to form an article of a predetermined thickness and having a horizontal bottom, ejecting mechanism for molded articles comprising: an opening in said bottom, an ejecting pin in said opening, of a length substantially the same as the thickness of the article to be molded, a curved tube secured to said bottom at said opening and communicating therewith, a flexible thrust rod in said tube with one end secured to said pin, a prime mover, and a mechanical connection between said prime mover and the other end of said thrust rod.

11. In combination with a mold including a female mold designed to form an article of a predetermined thickness and having a horizontal bottom, ejecting mechanism for molded articles comprising: a plurality of openings in said bottom in spaced related, each of said openings having a countersink at its upper end, a threaded ejector pin in each opening and of a length substantially the same as the article to be molded with the head of each pin being received in a countersink, a plurality of curved tubes secured to the underside of said bottom, there being a tube for each opening with which that tube communicates, a flexible thrust rod in each tube having one end connected to the pin in the opening for that tube, a prime mover, and mechanical connections between said prime mover and the ends of said thrust rods remote from said springs.

References Cited by the Examiner

UNITED STATES PATENTS

| | | |
|---|---|---|
| 1,402,293 | 1/1922 | Heist. |
| 2,602,190 | 7/1952 | Hein et al. |
| 2,864,123 | 12/1958 | Gora _____ 18—42 X |
| 3,130,446 | 4/1964 | Duerksen _____ 18—18 X |
| 3,165,787 | 1/1965 | Carmack _____ 18—42 |

FOREIGN PATENTS 493,009   1938   Great Britain.

J. SPENCER OVERHOLSER, *Primary Examiner.*

J. HOWARD FLINT, JR, *Examiner.*